(12) United States Patent
Blauch et al.

(10) Patent No.: US 7,131,491 B2
(45) Date of Patent: Nov. 7, 2006

(54) AQUEOUS-BASED TACKIFIER FLUIDS AND METHODS OF USE

(75) Inventors: Matthew E. Blauch, Duncan, OK (US); Thomas D. Welton, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 260 days.

(21) Appl. No.: 10/864,618

(22) Filed: Jun. 9, 2004

(65) Prior Publication Data

US 2005/0274517 A1    Dec. 15, 2005

(51) Int. Cl.
*E21B 33/138*    (2006.01)
*E21B 43/04*     (2006.01)
*E21B 43/267*    (2006.01)

(52) U.S. Cl. .................. 166/276; 166/280; 166/281; 166/295; 523/131

(58) Field of Classification Search .............. None
See application file for complete search history.

(56) References Cited

U.S. PATENT DOCUMENTS

| | | | |
|---|---|---|---|
| 4,670,501 A | 6/1987 | Dymond et al. | 524/458 |
| 4,681,165 A | 7/1987 | Bannister | 166/312 |
| 4,772,646 A | 9/1988 | Harms et al. | 524/27 |
| 4,777,200 A | 10/1988 | Dymond et al. | 524/458 |
| 5,095,987 A | 3/1992 | Weaver et al. | 166/276 |
| 5,249,627 A | 10/1993 | Harms et al. | 166/308 |
| 5,278,203 A | 1/1994 | Harms | 523/200 |
| 5,492,178 A | 2/1996 | Nguyen et al. | 166/280 |
| 5,501,274 A | 3/1996 | Nguyen et al. | 166/276 |
| 5,582,249 A | 12/1996 | Caveny et al. | 166/276 |
| 5,697,440 A | 12/1997 | Weaver et al. | 166/281 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,921,317 A | 7/1999 | Dewprashad et al. | 166/208 |
| 5,924,488 A | 7/1999 | Nguyen et al. | 166/280 |
| 5,960,878 A | 10/1999 | Nguyen et al. | 166/276 |
| 6,016,870 A | 1/2000 | Dewprashad et al. | 166/295 |
| 6,047,772 A | 4/2000 | Weaver et al. | 166/276 |
| 6,059,034 A | 5/2000 | Rickards et al. | 166/280 |
| 6,209,643 B1 | 4/2001 | Nguyen et al. | 166/276 |
| 6,311,773 B1 | 11/2001 | Todd et al. | 166/280 |
| 6,330,916 B1 | 12/2001 | Rickards et al. | 166/280 |
| 6,439,309 B1 | 8/2002 | Matherly et al. | 166/276 |
| 6,450,260 B1 | 9/2002 | James et al. | 166/277 |
| 6,534,449 B1 | 3/2003 | Gilmour et al. | 507/203 |
| 6,742,590 B1 * | 6/2004 | Nguyen | 166/280.1 |
| 6,851,474 B1 * | 2/2005 | Nguyen | 166/276 |
| 6,877,560 B1 * | 4/2005 | Nguyen et al. | 166/276 |
| 7,001,872 B1 * | 2/2006 | Pyecroft et al. | 507/211 |
| 2003/0230408 A1 | 12/2003 | Acock et al. | 166/297 |
| 2004/0014608 A1 | 1/2004 | Nguyen et al. | 507/200 |

FOREIGN PATENT DOCUMENTS

| | | |
|---|---|---|
| EP | 1132569 A2 | 12/2001 |
| WO | EP 0 879 935 A2 | 11/1998 |

OTHER PUBLICATIONS

Foreign Search Report and Opinion (PCT Appl. No. GB2004/002943), Nov. 19, 2004.
Attia, Yosry, et al, *Adsorption Thermodynamics of a Hydrophobic Polymeric Flocculant on Hydrophobic Colloidal Coal Particles*, 1991, American Chemical Society, *Langmuir*, 7, pp. 2203-2207.

* cited by examiner

*Primary Examiner*—Frank S. Tsay
(74) *Attorney, Agent, or Firm*—Robert A. Kent; Baker Botts

(57) ABSTRACT

The present invention relates to aqueous based tackifier fluids and their use in stabilizing particulates in propped fractures. Some embodiments of the present invention provide methods of creating a proppant pack in a subterranean formation, comprising introducing an aqueous servicing fluid comprising proppant particulates, wherein at least some of the proppant particulates are at least partially coated with an aqueous tackifier compound, into a subterranean fracture; and, activating the aqueous tackifier compound so as to form a proppant pack. Other embodiments provide methods of stabilizing a proppant pack comprising introducing an aqueous tackifier compound to at least a portion of an existing proppant pack; and, activating the aqueous tackifier compound so as to stabilize the proppant pack. Other embodiments provide servicing fluids comprising proppant particulates and an aqueous fluid wherein at least some of the proppant particulates are at least partially coated with an aqueous tackifier compound.

65 Claims, No Drawings

AQUEOUS-BASED TACKIFIER FLUIDS AND METHODS OF USE

CROSS-REFERENCE TO RELATED APPLICATION

This application is related to an application filed on the same day and titled "Aqueous Tackifier and Methods of Controlling Particulates" with named inventors Matt Blauch, Thomas Welton, and Philip Nguyen.

BACKGROUND OF THE INVENTION

The present invention relates to aqueous based tackifier fluids and their use in stabilizing particulates in propped fractures.

Hydrocarbon-producing wells are often stimulated by hydraulic fracturing treatments. In hydraulic fracturing treatments, a viscous fracturing fluid is pumped into a producing zone at a rate and pressure such that the subterranean formation breaks down and one or more fractures are formed in the zone. Particulate solids, such as graded sand, which are often referred to as "proppant" are suspended in a portion of the fracturing fluid and then deposited in the fractures when the fracturing fluid is converted to a thin fluid to be returned to the surface. These particulates serve, inter alia, to prevent the fractures from fully closing so that conductive channels are formed through which produced hydrocarbons can flow.

To prevent the subsequent flow-back of proppant and other particulates with the produced fluids, a portion of the proppant introduced into the fractures may be coated with a curable resin that may facilitate the consolidation the proppant particles in the fracture. Typically, the resin-coated proppant is deposited in the fracture after a large quantity of uncoated proppant has been deposited therein. The partially closed fractures apply pressure to the resin-coated proppant particulates whereby the particulates are forced into contact with each other while the resin enhances the grain-to-grain contact between individual proppant particles. The action of the pressure and the resin bring about the consolidation of the proppant particles into a hard, permeable mass having compressive and tensile strength, serving to prevent unconsolidated proppant and formation sand from flowing out of the fractures with the produced fluids and damaging production equipment and/or the potential production of the well.

In conjunction with or instead of resins, some or all of the proppant may be coated with a tackifier to help control the migration of formation fines through the proppant pack. Tackifiers, by their nature, remain sticky or retain adhesive character even after being placed in the formation. Thus, as formation fines attempt to flow through the pack with formation fluids, they can become entrained with the tackifying agent so as to not be produced with produced fluids.

The use of such tackifying agents has proven particularly useful in hydrocarbon and water production, especially in coal bed methane formations. However, traditional tackifying agents require hydrocarbon-based or non-aqueous carrier fluids, which may prove problematic in certain surface terrestrial, aquatic, or marine environments. Additionally, traditional agents often fail to provide the highly elastic proppant-to-proppant bond that is desirable in certain subterranean formations. Traditional tackifying agents also often lack the ability to control the onset of "tackification" (i.e., the tackifying agent cannot be placed as a non-tacky fluid that may then be activated to become tacky). Because of this, the proppant typically should be tackified before being placed in a fracture, limiting the ability to remediate and/or tackify proppant that has already been placed. Moreover, traditional tackifying agents tend to cure over time when exposed to oxidative environments.

SUMMARY OF THE INVENTION

The present invention relates to aqueous based tackifier fluids and their use in stabilizing particulates in propped fractures.

Some embodiments of the present invention provide methods of creating a proppant pack in a subterranean formation, comprising introducing an aqueous servicing fluid comprising proppant particulates, wherein at least some of the proppant particulates are at least partially coated with an aqueous tackifier compound, into a subterranean fracture; and, activating the aqueous tackifier compound so as to form a proppant pack.

Other embodiments of the present invention provide methods of stabilizing a proppant pack comprising introducing an aqueous tackifier compound to at least a portion of an existing proppant pack; and, activating the aqueous tackifier compound so as to stabilize the proppant pack.

Other embodiments of the present invention provide methods of controlling proppant particulate flowback from a proppant pack, comprising introducing an aqueous carrier fluid comprising proppant particulates, wherein at least some of the proppant particulates are at least partially coated with an aqueous tackifier compound, into a subterranean fracture so as to form a proppant pack; and, activating the aqueous tackifier compound.

Other embodiments of the present invention provide servicing fluids comprising proppant particulates and an aqueous fluid wherein at least some of the proppant particulates are at least partially coated with an aqueous tackifier compound.

Other embodiments of the present invention provide proppant particulates coated with an aqueous tackifier compound.

The features and advantages of the present invention will be readily apparent to those skilled in the art upon a reading of the description of the preferred embodiments that follows.

DESCRIPTION OF PREFERRED EMBODIMENTS

The present invention relates to aqueous based tackifier fluids and their use in stabilizing particulates in propped fractures.

In accordance with the present invention, an aqueous tackifier compound may be coated onto a particulate (such as a proppant particulate) introduced into a portion of a subterranean fracture comprising unconsolidated particulates. As used in the present invention, the term "tacky," in all of its forms, generally refers to a substance having a nature such that it is (or may be activated to become) somewhat sticky to the touch. As used herein the term "unconsolidated" refers to a situation in which particulates are loosely bound together, unbound, or so weakly bound as to be able to migrate with fluids moving throughout a portion of a subterranean formation. For example, proppant particulates that are not sufficiently bonded together with resin and that tend to migrate with fluids within the formation may be thought of as unconsolidated.

Suitable aqueous tackifier compounds are capable of forming at least a partial coating upon the surface of a particulate (such as proppant). Generally, suitable aqueous tackifier compounds are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifier compound is placed in the subterranean formation. In some embodiments, a pretreatment may be first contacted with the surface of a particulate to prepare it to be coated with an aqueous tackifier compound.

Some embodiments of the present invention describe method of using aqueous tackifier compounds both to control unconsolidated particulates existing in a subterranean formation and to stabilize interface regions in a subterranean formation so as to discourage the release or generation of particulates (such as fines) from the interface. In some embodiments of the present invention, the aqueous tackifier compound, once activated, helps to stabilize particulates through an enhanced form of flocculation. As in normal flocculation, the tackified particulates clump together; however, the enhanced flocculation brought about by the aqueous tackifier compounds of the present invention also allows the flocced, tacky particulates to adhere to surfaces they come in contact with (e.g., the surface of the formation face or of another particulate). Since the particulates are tackified and remain tacky, in the event the flocced particulates break loose from a surface to which they have adhered, they have the ability to re-adhere to another surface. This further reduces the probability the tackified particulates will migrate with formation fluids and impair the production of the well.

Some embodiments of the present invention provide methods of remediating subterranean fractures without the need to re-fracture or re-set proppant particulates that may have been deposited in the fracture. In embodiments of the present invention that encompass "remedial operations" (i.e. operations wherein a proppant pack is already in place and undesirable flow back has begun to occur and needs to be remediated or operations wherein a formation has begun to spall and an unstable formation surface needs to be remediated), the aqueous tackifier compounds of the present invention may be particularly well suited due, in part, to the fact that they may be placed within the region to be remediated as a non-tacky substance and then activated to take on a tacky character. An aqueous tackifier compound of the present invention may be particularly well suited for such remedial applications due, in part, to the fact that it may be placed within the region of the proppant pack as a non-tacky or adsorptive substance and then activated to take on a tacky character, thus targeting the particle surfaces while not being present in the pore spaces.

Aqueous tackifying compounds of the present invention are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water (further described in Example 7). The aqueous tackifier compound enhances the grain-to-grain contact between the individual particulates within the formation (be they proppant particulates, formation fines, or other particulates), helping bring about the consolidation of the particulates into a cohesive, flexible, and permeable mass.

Examples of aqueous tackifier compounds suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof.

While many potential methods exist for determining a suitable aqueous tackifier, one practical method of choosing a suitable polymer is as follows: place the polymer being tested in concentrated form (that is, about 20–50% concentration) and add an activator to it. If the mixture, empirically, appears to coagulate to form a solid or semisolid mass than the polymer represents a suitable aqueous tackifier according to the present invention. If the mixture does not appear to coagulate to form a solid or semisolid mass, then another activator should be chosen and the test repeated. One skilled in the art, knowing the desired result of coagulation, will be able to select likely activators. For example, when testing an acrylate-based polymer for suitability as an aqueous tackifier, an mixture comprising 50% Acetic Anhydride and 50% Glacial Acetic acid (v/v) is a likely activator. The choice of aqueous tackifier compounds may depend, inter alia, on the down hole conditions (e.g., salinity, temperature, and/or pH). The relationship between these and other down hole conditions will not be uniform across all suitable aqueous tackifier compounds. For instance, high salinity might accelerate activation for some aqueous tackifier compounds while delaying activation for others. One skilled in the art will be able to determine the effect of the particular down hole conditions on the chosen aqueous tackifier compound. For example, when using a polyacrylate polymer, high salinity and/or extremes of pH (either above about 9 or below about 5) generally accelerate activation.

As described above, suitable aqueous tackifier compounds are generally charged polymers; they preferentially attach to surfaces having an opposite charge. For instance, an aqueous tackifier compound having a negative charge will preferentially attach to surfaces having a positive to neutral zeta potential and/or a hydrophobic surface. Similarly, using analogous chemistry, positively charged aqueous tackifier compounds will preferentially attach to negative to neutral zeta potential and/or a hydrophilic surfaces. In particular embodiments where the surface (formation or particulate) being treated lacks an adequately receptive surface (that is, the surface being treated lacks a charge substantially opposite of the chosen aqueous tackifier compound), a pretreatment fluid may be used to make the surfaces more receptive to the aqueous tackifier compound. For example, one could use a pretreatment such as a cationic polymer to treat a surface with a negative zeta potential or treat a surface with a positive zeta potential by using anionic pretreatments. As will be understood by one skilled in the art, amphoteric and zwitterionic pretreatment fluids may also be used so long as the conditions they are exposed to during use are such that they display the desired charge. Suitable pretreatment fluids include charged fluids comprising a charged surfactant, a charged polymer, or a combination thereof. As will be understood by one of skill in the art, with the benefit of this disclosure, the use of a pretreatment is optional and depends, at least in part, on the charge disparity or lack thereof between the chosen aqueous tackifier compound and the surface being treated.

As mentioned above, the aqueous tackifier compound is initially non-tacky and becomes tacky when contacted with an activator. Typically, the activator is an organic acid (or an anhydride of an organic acid that is capable of hydrolyzing in water to create an organic acid), an inorganic acid, an inorganic salt (such as a brine), a charged surfactant, a charged polymer, or a combination thereof, but any substance that is capable of making the aqueous tackifier compound insoluble in an aqueous solution may be used as an activator in accordance with the teachings of the present invention. The choice of an activator may vary, depending on, inter alia, the composition of the aqueous tackifier compound. An example of one activator suitable for use in the present invention is an acetic acid/acetic anhydride blend. Other acids, acids salts, anhydrides, and mixtures thereof may be also suitable. Again, this is analogous to coagulation. For example, many nature rubber latexes are coagulated with acetic or formic acid during the manufacturing process. Suitable salts include, but are not limited to, sodium chloride, potassium chloride, calcium chloride, and mixtures thereof. In another exemplary embodiment of the present invention, the concentration of salts or other activating compounds present in the formation water itself may be sufficient to activate the aqueous tackifier compound. In such an embodiment it may not be necessary to add an external activator. Generally, when used, the activator is present in an amount in the range of from about 0.1% to about 40% by weight of the fluid volume; however, in some cases such as with brines the activator may be in excess of the treatment fluids and aqueous tackifier compound. However, any compound that will cause the activation of the aqueous tackifier compound (e.g., causing the aqueous tackifier compound to become insoluble) may be used within the teachings of the present invention, regardless of the concentration of activator necessary to trigger the activation of the aqueous tackifier compound.

The family of suitable activators is substantially the same as the family of suitable pretreatment fluids; the distinction lies, at least in part, with the amount used and the timing of its use. For example, where the same chemical or chemicals are used as a pretreatment fluid and as an activator, the pretreatment fluid may make up only from about 0.1% to about 5% of the volume of the total amount used. One skilled in the art will recognize that the pretreatment fluid is primarily used to prepare a surface to accept an aqueous tackifier compound and, generally, will not be used in an amount sufficient to substantially activate the aqueous tackifier compound. Moreover, in certain embodiments, an activator may not be necessary at all. For example, the portion of a subterranean formation being treated may contain a sufficient level of salts in the formation fluids that simply placing an aqueous tackifier compound into the formation and allowing it to contact the existing fluids will result in desired activation.

In some embodiments of the present invention aqueous tackifier compounds are used to coat proppant particulates. Suitable proppant particulates are generally of a size such that formation fines that may migrate with produced fluids are prevented from being produced from the subterranean zone. Any suitable proppant particulates may be used, including graded natural sand or nut shells, or constructed materials such as bauxite, ceramic materials, glass materials, polymer beads, composite particles, and the like. Generally, the proppant particulates have a size in the range of from about 4 to about 400 mesh, U.S. Sieve Series. In some embodiments of the present invention, the proppant particulates are graded sand having a particle size in the range of from about 10 to about 70 mesh, U.S. Sieve Series. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments to, inter alia, increase the conductivity of a resulting pack.

In particular embodiments of the present invention, the proppant particulates may be at least partially coated with a curable resin. In particular embodiments, this resin-coated proppant ("RCP") may comprise proppant that has been pre-coated by a commercial supplier. Suitable commercially available RCP materials include, but are not limited to, pre-cured resin-coated sand, curable resin-coated sand, curable resin-coated ceramics, single-coat, dual-coat, or multi-coat resin-coated sand, ceramic, or bauxite. Some examples available from Borden Chemical, Columbus, Ohio, are "XRT™ CERAMAX P," "CERAMAX I," "CERAMAX P," "ACFRAC BLACK," "ACFRAC CR," "ACFRAC SBC," "ACFRAC SC," and "ACFRAC LTC." Some examples available from Santrol, Fresno, Tex., are "HYPERPROP G2," "DYNAPROP G2," "MAGNAPROP G2," "OPTIPROP G2," "SUPER HS," "SUPER DC," "SUPER LC," and "SUPER HT."

Suitable curable resin compositions include those resins that are capable of forming hardened, consolidated masses. Suitable resins include, but are not limited to, two-component epoxy-based resins, novolak resins, polyepoxide resins, phenol-aldehyde resins, urea-aldehyde resins, urethane resins, phenolic resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be of the two-component variety mentioned above and use an external catalyst or activator. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. Selection of a suitable resin coating material may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin also may be suitable. It is within the ability of one skilled in the art, with the benefit of this disclosure, to select a suitable resin for use in embodiments of the present invention and to determine whether a catalyst is required to trigger curing.

In particular embodiments of the present invention, the proppant particulates may be pre-coated with an aqueous tackifier compounds. In other embodiments of the present invention, the proppant may be coated with the aqueous tackifier compounds on-the-fly, as opposed to being pre-coated.

Some embodiments of the present invention describe methods of fracturing a subterranean formation using proppant particulates wherein the proppant particulates are at least partially coated with an aqueous tackifier compound. In such embodiments, the proppant particulates are generally delivered to a portion of a subterranean formation by first being slurried into a servicing fluid (such as a fracturing fluid).

Suitable servicing fluids of the present invention may be aqueous fluids, emulsions, foams, or any other known form of subterranean fluids known in the art. In some embodiments the servicing fluids of the present invention comprise fresh water. In some embodiments, salt water solutions may also be used as a servicing fluid provided the salt concentration of the fluid does not act undesirably to activate and/or destabilize the aqueous tackifier compound. Aqueous gels, foams, straight nitrogen, carbon dioxide, emulsions, and other suitable fracturing fluids (crosslinked or uncrosslinked) may also be used in accordance with the present invention. The aqueous gels are generally comprised of water and one or more gelling agents. The emulsions may be comprised of two immiscible liquids such as an aqueous gelled liquid and a liquefied, normally gaseous fluid, such as nitrogen or carbon dioxide. In exemplary embodiments of the present invention, the servicing fluids are aqueous gels comprised of water, a gelling agent for gelling the water and increasing its viscosity, and, optionally, a cross-linking agent for cross-linking the gel and further increasing the viscosity of the fluid. The increased viscosity of the gelled, or gelled and cross-linked, servicing fluid, inter alia, reduces fluid loss and may allow the servicing fluid to transport significant quantities of suspended proppant particulates. The water used to form the servicing fluid may be fresh water, salt water, brine, or any other aqueous liquid that does not adversely react with the other components. By using an aqueous servicing fluid, the environmental impact of subterranean treatments in accordance with the present invention may be minimized or reduced, particularly where the servicing fluid is discharged into the surface terrestrial, aquatic, or marine environments or the fluid is regulated under the U.S. EPA Safe Drinking Water Act (Section 1425, 42 U.S.C. 3000h-4(a), Section 1422(b), 42 U.S.C. 300h-1 (b).

In embodiments of the present invention comprising the use of a servicing fluid (such as a cross-linked gel), an activator may be unnecessary (as in the situation in which the subterranean fluid or the servicing fluid itself inherently contains adequate activating compounds), an activator may be included in the servicing fluid itself, an activator may be placed into a pre-flush fluid that is placed into the formation before the servicing fluid, an activator may be included in a post-flush fluid that is placed into the formation after the servicing fluid, or come combination of the placement of one or more activators may be used. As described above, the activator is generally present in an amount in the range of from about 0.1% to about 40% of the total fluid volume; however, in the case of brines or fracturing fluids, it may be in vast excess. In other embodiments, the activator is present in an about from about 0.2% to about 25% of the total fluid volume. In other embodiments, the activator is present in an about from about 0.5% to about 10% of the total fluid volume. It should be understood that any compound that will cause the activation of the aqueous tackifier compound (e.g., causing the aqueous tackifier compound to coagulate and becomes viscous) may be used within the teachings of the present invention, regardless of the concentration of activator necessary to trigger the activation of the aqueous tackifier compound.

Although the activation of the aqueous tackifier compound may occur before, during, or after the placement of the proppant within a subterranean fracture, particular embodiments of the present invention activate the aqueous tackifier compound after the placement of the proppant as a means to treat an existing proppant pack. This is particularly useful in situations where it may be undesirable to place the aqueous tackifier compound in its tackified form, such as in a remedial operation. In this way, the aqueous tackifier compound may be activated to form a highly tacky compound, or tackifier, that specifically, or preferentially, adheres to the desired proppant surfaces having either a natural or induced affinity for the tackifier.

Thus, the aqueous tackifier compound may be exposed to the activator at any of a number of different times in the hydraulic fracturing treatment. In a particular embodiment of the present invention, the activator may be mixed with the carrier fluid at the approximately same time as the aqueous tackifier compound. In this manner, the aqueous tackifier compound, as introduced in the subterranean formation, is already activated or at least in the process of being activated. In another embodiment of the present invention, the activator may be introduced into the subterranean formation at some time after the aqueous tackifier compound has been introduced into the formation (e.g., the aqueous tackifier compound may be present in the subterranean formation for some time before it is activated). In this manner, the aqueous tackifier compound provides the ability to remedially tackify a fracture in the event spalling occurs or proppant particulates or fines need to be reconsolidated. One skilled in the art will recognize that the decision on whether to premix an activator and an aqueous tackifier compound depends, at least in part, on the activator chosen. For example, a salt activator may tend to activate the aqueous tackifier compound more rapidly than a charged surfactant activator.

To facilitate a better understanding of the present invention, the following examples of preferred embodiments are given. In no way should the following examples be read to limit or define the scope of the invention.

EXAMPLES

Example 1

A base gel comprising a borate crosslinked fracturing fluid containing 35 lb per 1000 gallon of dry guar polymer was prepared by mixing 1 liter of water containing 20 grams of KCl salt, 4.2 grams of dry guar polymer, and 0.2 ml of an acetic acid/ammonium acetate mixture (used as a pH buffer to lower the mixture's pH to about 6.5) and allowing the guar to hydrate while mixing in the blender for approximately 10 minutes. Following the hydration step, 2.5 ml of a potassium carbonate was added (used as a pH buffer) to raise pH to final base gel to about 10.2.

Brady sand (20/40 mesh) was treated with 1 ml quaternary ammonium surfactant per 250 grams of Brady sand and then dry coated with a 3 weight percent coating of a 40% solution of a polyacrylate ester polymer.

250 grams of the coated 20/40 Brady sand was then placed in a clean 1-liter beaker 300 ml of the base gel solution is added, and the beaker was placed into a 140 F. water bath with an overhead mixer. While mixing, 0.32 ml of a borate crosslinker was added to the base gel/proppant slurry for about 2 minutes to allow the crosslink to initiate.

A stable crosslink was achieved and compared to a control test run using proppant without the inventive treatment. Both fluids remained stable indicating the inventive solution did not have significant negative effects on the fluid stability; that is, it exhibited no detrimental effects such as failure to crosslink or premature breaking.

Upon breaking the crosslink gel with HCl, the coated sand was separated and tested and proved to exhibit a desired tacky character and improved T-test performance (see below). Moreover, the coated sand was found not to require additional activator to achieve desired coating properties due, at least in part, to the fact that the fracturing gel system contained activators such as KCl and was also exhibited a favorable activation pH for the acrylic-based polymer.

Example 2

Brazos River sand with particle size smaller than 100-mesh was used to simulate formation sand. This material was packed inside a 1-inch ID tapered Teflon sleeve having a length of 5 inches. About 0.5 inch thick of 20/40 mesh Ottawa sand was packed below and above the Brazos River sand material. The sand column was then saturated with 3% KCl brine and flushed with this brine at 5 mL/min for several pore volumes to determine the initial permeability of the sand pack. The column containing Brazos River sand was then treated with 2 pore volumes of the treatment fluid (4% by volume of a 40% solution of polyacrylate ester polymer, 0.5% activator, 0.1% cationic surfactant, 0.1% amphoteric surfactant, balance water). KCl brine (3%) was then used to overflushed the sand pack with 5 pore volumes. The treated sand column was then placed in the oven for curing at 175° F. for 20 hours.

After the curing period, flow from an opposite direction using 3% KCl brine was established through the treated sand column. Flow rate was held constant at 5 mL/min to determine the retained permeability of the sand pack as compared to that of the initial permeability. More than 95% of the permeability of the treated sand pack was retained and there was no sign of produced fines in the effluent collected during the 5 mL/min flow of KCl used to establish regained permeability.

The results from this example confirm that the treatment fluid was able to stabilize the formation sand material without causing excessive damage to the permeability of the sand pack.

Example 3

Similar preparation and test procedure as described in Example 2 were repeated in this example, except that different concentrations of the treatment fluid were used. Brazos River sand was used to simulate formation fines. This material was packed inside a 1-inch ID tapered Teflon sleeve having a length of 5 inches. About 0.5 inch thick of Ottawa sand with mesh size of 20/40 mesh was packed below and above the Brazos River sand material. The sand column was then saturated with 3% KCl brine and flushed with this brine at 5 mL/min for several pore volumes to determine the initial permeability of the sand pack. Then, two pore volumes of the treatment fluid (2% by volume of a 40% solution of polyacrylate ester polymer, 0.5% activator, 0.1% cationic surfactant, 0.1% amphoteric surfactant, balance water) was added. KCl brine (3%) was then used to overflush the sand pack with 5 pore volumes.

The treated sand column was then placed in the oven for curing at 175° F. for 20 hours. After the curing period, flow from an opposite direction using 3% KCl brine was established through the treated sand column. Flow rate was held constant at 5 mL/min to determine the retained permeability of the sand pack as compared to that of the initial permeability.

More than 97% of the permeability of the treated sand pack was retained. Again, there was no sign of fines produced in the effluents that were collected during the flow of regained permeability.

Example 4

Brazos river sand was used as simulated formation sand. The material was packed into two 1.5-inch ID brass cells and sandwiched between sand packs of 70/170-mesh sand. The sand column was flushed with 3 pore volumes of 3% KCl brine, followed by 2 pore volumes of treatment fluid (5% by volume of a 40% solution of polyacrylate ester polymer, 0.5% activator, 0.2% surfactants, balance water), and overflushed with 3 pore volumes of 3% KCl brine.

One cell was then placed in oven at 175° F. for 20 hours and one was placed in oven at 325° F. for 20 hours to simulate down hole curing of the well. After curing period, the treated sand was removed from the cell and observed for texture, shape, and flexibility. The treated Brazos River sand appeared as a firm structure which took the shape of the cell. Despite of having negligible consolidation strength as commonly observed with consolidated rock, the treated Brazos River sand grains stick together to form a stable structure.

Example 5

Brazos river sand was used as simulated formation sand. The material was packed into two 1.5-inch ID brass cells and sandwiched between sand packs of 70/170-mesh sand. The sand column was flushed with 3 pore volumes of 3% KCl brine, followed by 2 pore volumes of treatment fluid (5% by volume of a 40% solution of polyacrylate ester polymer, 0.5% activator, 0.2% surfactants, balance water) and no overflush was applied.

One treated column was then placed in oven at 175° F. for 20 hours and one was placed in oven at 325° F. for 20 hours to simulate down hole curing of the well. After curing period, the treated sand was removed from the cell and observed for texture, shape, and flexibility. The treated Brazos River sand appeared as a firm structure which took the shape of the cell. Despite of having negligible consolidation strength as commonly observed with consolidated rock, the treated Brazos River sand grains stick together to form a stable structure.

Example 6

Fines of Brazos River sand with sieve size of 200-mesh and smaller were used to simulate formation fines. The material was packed inside a 1-inch ID transparent acrylic flow cell for ease of observation. Ottawa sand with mesh size of 20/40 mesh was pack below and above this formation fines material. The sand column was then saturated with 3% KCl brine and flushed with this brine for 5 volumes, followed by 2 pore volumes of treatment fluid (2% by volume of a 40% solution of polyacrylate ester polymer, 0.5% activator, 0.2% surfactants, balance water), and then overflushed with 2 pore volumes of 3% KCl brine.

The treated sand column was then placed in the oven for curing at 140° F. for 20 hours. After the curing period, flow using 3% KCl brine was established through the treated sand column with an opposite direction from that during treatment. Flow rate was started at 10 mL/min and incrementally increased to 80 mL/min. Effluents were collected to help confirm what had been observed in the cell during the flow. The results all indicated that the treated column was able to completely control fines migration through out all the flow rates as compared to the control.

For comparison, identical sand column prepared, but without concentration treatment fluid treatment, was used as the control. It was observed that as soon as flow was established, fines particulate immediately began to migrate into the sand pack and produced out as part of the effluent, even at 10 mL/min.

Example 7

A sample of 20/40 Brady Sand was treated (41.25% polyacrylate ester polymer concentrate, 3.75% surfactants, 30% water followed by 25% activator) at about 2% (v/w) based on total treatment fluid volume. This sample was then placed in a T-test as described as follows. The evaluation of a liquid or solution of a compound for use as a tackifying compound may be accomplished by the following test: First, a critical resuspension velocity is determined for the material upon which the tackifying compound is to be coated. One suitable test apparatus comprises a ½" glass tee that is connected to an inlet source of water and an outlet disposal line is blocked to fluid flow. A water-based slurry of particulates is aspirated into the tee through inlet and collected within portion by filtration against a screen. When portion of tee is full, the vacuum source is removed and a plug is used to seal the end of portion. The flow channel from inlet to outlet then is swabbed clean and a volumetrically controlled pump is connected to inlet and a controlled flow of water is initiated. The velocity of the fluid is slowly increased through inlet until the first particle of particulate material is picked up by the flowing water stream. This determines the baseline for the starting of the resuspension velocity. Next, the flow rate then is further increased until the removal of particles becomes continuous. This determines the baseline for the continuous resuspension velocity. Next, the test may then be terminated and the apparatus is refilled with particulate having a coating corresponding to about 0.5 percent active material by weight of the particulate applied thereto. Similar trends generally are seen in the results when the concentrations tested are from about 0.1 to about 3 percent, however, the 0.5 percent level which is within the preferred application range is preferred for standardization of the procedure. The test may be repeated to determine the starting point of particulate removal and the velocity at which removal becomes continuous. The percent of velocity increase (or decrease) then is determined based upon the initial or continuous baseline value.

Effectively treated proppant will resist transport as compared to untreated proppant. The test sample did not show signs of movement even when the test apparatus flowed at its maximum rate of 2,000 mL/min. Untreated 20/40 Brady Sand started flowing at 154 mL/min; the treated sand resisted flowing at fluid rates over 13-times faster than untreated.

Example 8

A sample of 20/40 Brady Sand was treated (40% acrylate polymer concentrate, 5% surfactants, 10% activator, balance water) at about 2% (v/w) based on total treatment fluid volume. This sample showed a 13% improvement of proppant conductivity versus untreated 20/40 Brady Sand. The treated proppant was also observed to exhibit desired adhesive character with individual proppant grains adhesively and elastically bound together.

Example 9

One method of determining whether a polymer is suitable for use as an aqueous tackifier: Prepare mixture consisting of 50% Acetic Anhydride and 50% Glacial Acetic acid (v/v). Place 10 ml of test polymer into 60 ml glass bottle. Next, add 40 ml of deionized water and hand swirl to mix. Then, add 15 ml of acetic acid/acetic anhydride (or other activator). Shake bottle vigorously for 30 s. A suitable polymer will form a solid or semi-solid mass. Repeat screen with other known activators such as acetic acid/acetic anhydride blend, other acids, acids salts, anhydrides, charged polymers, charged surfactants, sodium chloride, potassium chloride, calcium chloride and mixtures thereof.

Example 10

Treatments were performed on a coal bed methane field exhibiting relatively low individual well production. Well production was suspected to be at least partially impaired by coal fines blocking inflow of gas to the well bore. The wells had been previously hydraulically fractured in multiple coal seams. Two wells were treated with solution comprising acetic anhydride, glacial acetic acid, a polyacrylate ester polymer aqueous tackifier compound, enzyme, and oxidizer in water.

The first well went from a methane production of about 43 MCFD (thousand cubic feet per day) before treatment to about 75 MCFD after treatment. Similarly, the second well went from a methane production of about 80 MCFD before treatment to about 105 MCFD after treatment. Moreover, observations from these treated wells show the produced water to be free of fine particulates as compared to their pre-treatment state; thus supporting the hypothesis that effective stabilization of the formation particles was achieved.

Example 11

A 50 ml slurry of ground coal particles (Subitmunious A) was prepared from dry coal ground with a mortar and pestle and placed into a bottle containing fresh water and slurried. The coal/water slurry was then treated with 10 ml of a solution comprising acetic anhydride, glacial acetic acid, water, and a polyacrylate ester polymer aqueous tackifier compound. Following treatment initial flocculation of the coal particles was observed over about a period of 12 hours, after which the coal particles were observed as an agglomerated mass that was capable of breaking and re-forming upon agitation. The water phase is clarified with no visible fine particles remaining in solution. This example illustrated visually the described process of coal fines stabilization and removal from aqueous solution.

Example 12

A solid sample of coal approximately 2 cm square was placed in a 60 ml bottle containing water. The bottle was then placed in an ultra-sonicator for 10 minutes. The result was a visible amount of coal particles that spalled from the surface of the larger chunk. In another bottle, a substantially identical sample of coal was treated with a solution comprising acetic anhydride, glacial acetic acid, water, and a polyacrylate ester polymer aqueous tackifier compound and then placed in water and then placed in an ultra-sonicator for 10 minutes. Visual observation of the treated coal sample showed a nearly complete lack of coal fines spalling from the surface of the coal that has been treated.

Example 13

A treatment was performed on a weakly consolidated gas producing clastic formation exhibiting low well production. Well production was suspected to be at least partially impaired by fines blocking inflow of gas to the well bore. The wells had been previously hydraulically fractured. The well was treated with an aqueous tackifier compound comprising a polyacrylate ester, acetic anhydride/acetic acid, quaternary ammonium surfactant, amphoteric surfactant, enzyme, and oxidizer in water. The well's production went from 30 MCFD to 200 MCFD, showing that the fines problem had been substantially remediated.

Example 14

A 100 gram sample of 20/40 Brady Sand was treated (2% cationic polyacrylamide polymer concentrate, 94% water followed by 4% acetic anhydride/acetic acid activator with 100 ml of cationic tackifing fluid. Upon recovery the Brady Sand exhibited the desired tacky characteristics.

Example 15

A 1 gram sample of activated coal fines was treated (2% cationic polyacrylamide polymer concentrate, 1% anionic surfactant, 93% water followed by 4% acetic anhydride/acetic acid activator) with 100 ml of cationic tackifing fluid. The fines were consolidated into a tacky mass within 5 minutes.

Example 16

A 1 gram sample of activated coal fines was treated (2% cationic polyacrylamide polymer concentrate, 1% anionic surfactant, 1% amphoteric surfactant, 92% water followed by 4% acetic anhydride/acetic acid activator) with 100 ml of cationic tackifing fluid. The fines were consolidated into a tacky mass within 5 minutes.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of creating a proppant pack in a subterranean formation, comprising:
   introducing an aqueous servicing fluid comprising proppant particulates, wherein at least some of the proppant particulates are at least partially coated with an aqueous tackifier compound, into a subterranean fracture; and
   activating the aqueous tackifier compound by exposing the aqueous tackifier compound to an activator so as to form a proppant pack.

2. The method of claim 1 wherein activating the aqueous tackifier compound forms a stable proppant pack.

3. The method of claim 1 wherein the servicing fluid comprises an aqueous fluid, emulsion, or foam.

4. The method of claim 1 wherein the servicing fluid comprises fresh water, salt water, or a combination thereof.

5. The method of claim 1 wherein the servicing fluid is crosslinked.

6. The method of claim 1 wherein the servicing fluid further comprises the activator.

7. The method of claim 1 wherein the activator is selected from the group consisting of an organic acid, an anhydride of an organic acid, an inorganic acid, an inorganic salt, a charged surfactant, a charged polymer, and a combination thereof.

8. The method of claim 1 wherein the aqueous tackifier compound is activated before introducing the proppant particulates into the subterranean fracture.

9. The method of claim 1 wherein the aqueous tackifier compound is activated while the proppant particulates are introduced into the subterranean fracture.

10. The method of claim 1 wherein the aqueous tackifier compound is activated subsequent to introducing the proppant particulates into the subterranean fracture.

11. The method of claim 1 wherein the aqueous tackifier compound preferentially binds to surfaces having a positive zeta potential.

12. The method of claim 1 wherein the aqueous tackifier compound preferentially binds to hydrophobic surfaces.

13. The method of claim 1 wherein the aqueous tackifier compound preferentially binds to surfaces having a negative zeta potential.

14. The method of claim 1 wherein the aqueous tackifier compound preferentially binds to hydrophilic surfaces.

15. The method of claim 1 wherein the aqueous tackifier compound is selected from the group consisting of an acrylic acid polymer, an acrylic acid ester polymer, an acrylic acid derivative polymer, an acrylic acid homopolymer, an acrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acidlacrylamido-methyl-propane sulfonate co-polymer, a copolymer thereof, and a mixture thereof.

16. The method of claim 1 wherein activating the aqueous tackifier compound comprises destabilizing the aqueous tackifier compound.

17. The method of claim 1 wherein the activator is selected from the group consisting of an organic acid, an anhydride of an organic acid, an inorganic acid, an inorganic salt, a charged surfactant, a charged polymer, and a combination thereof.

18. The method of claim 1 wherein the activator comprises an acetic acid/acetic anhydride blend.

19. The method of claim 1 wherein the proppant particulates are contacted with a pretreatment fluid before being at least partially coated with an aqueous tackifier compound.

20. The method of claim 19 wherein the pretreatment fluid is selected from the group consisting of an organic acid, an anhydride of an organic acid, an inorganic acid, an inorganic salt, a charged surfactant, a charged polymer, and a combination thereof.

21. The method of claim 1 wherein the proppant particulates is at least partially coated with resin before being at least partially coated with an aqueous tackifier compound.

22. A method of stabilizing a proppant pack comprising:
   introducing an aqueous tackifier compound to at least a portion of an existing proppant pack; and activating the aqueous tackifier compound by exposing the aqueous tackifier compound to an activator so as to stabilize the proppant pack.

23. The method of claim 22 wherein the aqueous tackifier compound is mixed with a servicing fluid before being placed into the portion of the subterranean formation.

24. The method of claim 23 wherein the servicing fluid comprises an aqueous fluid, emulsion, or foam.

25. The method of claim 23 wherein the servicing fluid comprises fresh water, salt water, or a combination thereof.

26. The method of claim 23 wherein the servicing fluid is crosslinked.

27. The method of claim 23 wherein the servicing fluid further comprises the activator.

28. The method of claim 22 wherein the activator is selected from the group consisting of an organic acid, an anhydride of an organic acid, an inorganic acid, an inorganic salt, a charged surfactant, a charged polymer, and a combination thereof.

29. The method of claim 22 wherein the aqueous tackifier compound is selected from the group consisting of an acrylic acid polymer, an acrylic acid ester polymer, an acrylic acid derivative polymer, an acrylic acid homopolymer, an acrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, a copolymer thereof, and a mixture thereof.

30. The method of claim 22 wherein activating the aqueous tackifier compound comprises destabilizing the aqueous tackifier compound.

31. The method of claim 22 wherein the activator is selected from the group consisting of an organic acid, an anhydride of an organic acid, an inorganic acid, an inorganic salt, a charged surfactant, a charged polymer, and a combination thereof.

32. The method of claim 22 wherein the activator comprises an acetic acid/acetic anhydride blend.

33. The method of claim 22 wherein at least a portion of the existing proppant pack is contacted with a pretreatment fluid before introducing the aqueous tackifier compound to at least a portion of an existing proppant pack.

34. The method of claim 33 wherein the pretreatment fluid is selected from the group consisting of an organic acid, an anhydride of an organic acid, an inorganic acid, an inorganic salt, a charged surfactant, a charged polymer, and a combination thereof.

35. The method of claim 22 wherein the proppant pack exhibits a higher conductivity after the aqueous tackifier has been activated than it had before the aqueous tackifier was activated.

36. A method of controlling proppant particulate flowback from a proppant pack, comprising:
introducing an aqueous carrier fluid comprising proppant particulates, wherein at least some of the proppant particulates are at least partially coated with an aqueous tackifier compound, into a subterranean fracture so as to form a proppant pack; and
activating the aqueous tackifier compound by exposing the aqueous tackifier compound to an activator.

37. The method of claim 36 wherein activating the aqueous tackifier compound forms a stable proppant pack.

38. The method of claim 36 wherein the servicing fluid comprises an aqueous fluid, emulsion, or foam.

39. The method of claim 36 wherein the servicing fluid comprises fresh water, salt water, or a combination thereof.

40. The method of claim 36 wherein the servicing fluid is crosslinked.

41. The method of claim 36 wherein the servicing fluid further comprises the activator.

42. The method of claim 36 wherein the activator is selected from the group consisting of an organic acid, an anhydride of an organic acid, an inorganic acid, an inorganic salt, a charged surfactant, a charged polymer, and a combination thereof.

43. The method of claim 36 wherein the aqueous tackifier compound is activated before introducing the proppant particulates into the subterranean fracture.

44. The method of claim 36 wherein the aqueous tackifier compound is activated while the proppant particulates are introduced into the subterranean fracture.

45. The method of claim 36 wherein the aqueous tackifier compound is activated subsequent to introducing the proppant particulates into the subterranean fracture.

46. The method of claim 36 wherein the aqueous tackifier compound preferentially binds to surfaces having a positive zeta potential.

47. The method of claim 36 wherein the aqueous tackifier compound preferentially binds to surfaces having a negative zeta potential.

48. The method of claim 36 wherein the aqueous tackifier compound is selected from the group consisting of an acrylic acid polymer, an acrylic acid ester polymer, an acrylic acid derivative polymer, an acrylic acid homopolymer, an acrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, a copolymer thereof, and a combination thereof.

49. The method of claim 36 wherein activating the aqueous tackifier compound comprises destabilizing the aqueous tackifier compound.

50. The method of claim 36 wherein the activator is selected from the group consisting of an organic acid, an anhydride of an organic acid, an inorganic acid, an inorganic salt, a charged surfactant, a charged polymer, and a combination thereof.

51. The method of claim 36 wherein the activator comprises an acetic acid/acetic anhydride blend.

52. The method of claim 36 wherein the proppant particulates are contacted with a pretreatment fluid before being at least partially coated with an aqueous tackifier compound.

53. The method of claim 52 wherein the pretreatment fluid is selected from the group consisting of an organic acid, an anhydride of an organic acid, an inorganic acid, an inorganic salt, a charged surfactant, a charged polymer, and a combination thereof.

54. The method of claim 36 wherein the proppant particulates is at least partially coated with resin before being at least partially coated with an aqueous tackifier compound.

55. A servicing fluid comprising proppant particulates, an aqueous fluid wherein at least some of the proppant particulates are at least partially coated with an aqueous tackifier compound, and an activator operable to activate the aqueous tackifier compound.

56. The servicing fluid of claim 55 wherein the aqueous fluid comprises fresh water, salt water, or a combination thereof.

57. The servicing fluid of claim 55 wherein the aqueous fluid is crosslinked.

58. The servicing fluid of claim 55 wherein the activator is selected from the group consisting of an organic acid, an anhydride of an organic acid, an inorganic acid, an inorganic salt, a charged surfactant, a charged polymer, and a combination thereof.

59. The servicing fluid of claim claim 55 wherein the activator comprises an acetic acid/acetic anhydride blend.

60. The servicing fluid of claim 55 wherein the aqueous tackifier compound preferentially binds to surfaces having a positive zeta potential.

61. The servicing fluid of claim 55 wherein the aqueous tackifier compound preferentially binds to surfaces having a negative zeta potential.

62. The servicing fluid of claim 55 wherein the aqueous tackifier compound is selected from the group consisting of an acrylic acid polymer, an acrylic acid ester polymer, an acrylic acid derivative polymer, an acrylic acid homopolymer, an acrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, a copolymer thereof, and a mixture thereof.

63. Proppant particulates coated with an aqueous tackifier compound that preferentially binds to surfaces having a positive zeta potential.

64. Proppant particulates coated with an aqueous tackifier compound that preferentially binds to surfaces having a negative zeta potential.

65. Proppant particulates coated with an aqueous tackifier compound comprises an acrylic acid polymer, acrylic acid ester polymer, acrylic acid derivative polymer, acrylic acid homopolymer, acrylic acid ester homopolymer, acrylamido-methyl-propane sulfonate polymer, acrylamido-methyl-propane sulfonate derivative polymer, acrylamido-methyl-propane sulfonate co-polymer, acrylic acid/acrylamido-methyl-propane sulfonate co-polymer, and copolymers thereof, or mixtures thereof.

* * * * *